United States Patent [19]

Desai et al.

[11] 4,369,307
[45] Jan. 18, 1983

[54] METHOD FOR REMOVING CARBON PARTICLES FROM A MOLDED ARTICLE

[75] Inventors: Nitin V. Desai, Hightstown; Robert F. Poll, Somerset, both of N.J.

[73] Assignee: RCA Corporation, New York, N.Y.

[21] Appl. No.: 206,944

[22] Filed: Nov. 14, 1980

[51] Int. Cl.³ .................. C08F 6/00; B01D 29/08
[52] U.S. Cl. ................. 528/488; 210/773; 210/807; 528/494
[58] Field of Search .......... 528/488, 491, 494, 501

[56] References Cited

U.S. PATENT DOCUMENTS 3,544,458 12/1970 Sato ..................... 210/807

OTHER PUBLICATIONS

Waters Associates Liquid Chromatograpy School, p. ES1.

Primary Examiner—C. A. Henderson, Jr.
Attorney, Agent, or Firm—Birgit E. Morris; Donald S. Cohen

[57] ABSTRACT

A method for separating out carbon particles from a composition comprising a plastic and carbon particles of submicron dimensions comprising the steps of adding the composition to an organic solvent for the plastic which does not dissolve the carbon particles at a concentration sufficiently dilute to allow the carbon particles to be free from the plastic and filtering the resulting mixture in a calcium carbonate column which traps essentially all of the carbon particles.

3 Claims, 1 Drawing Figure

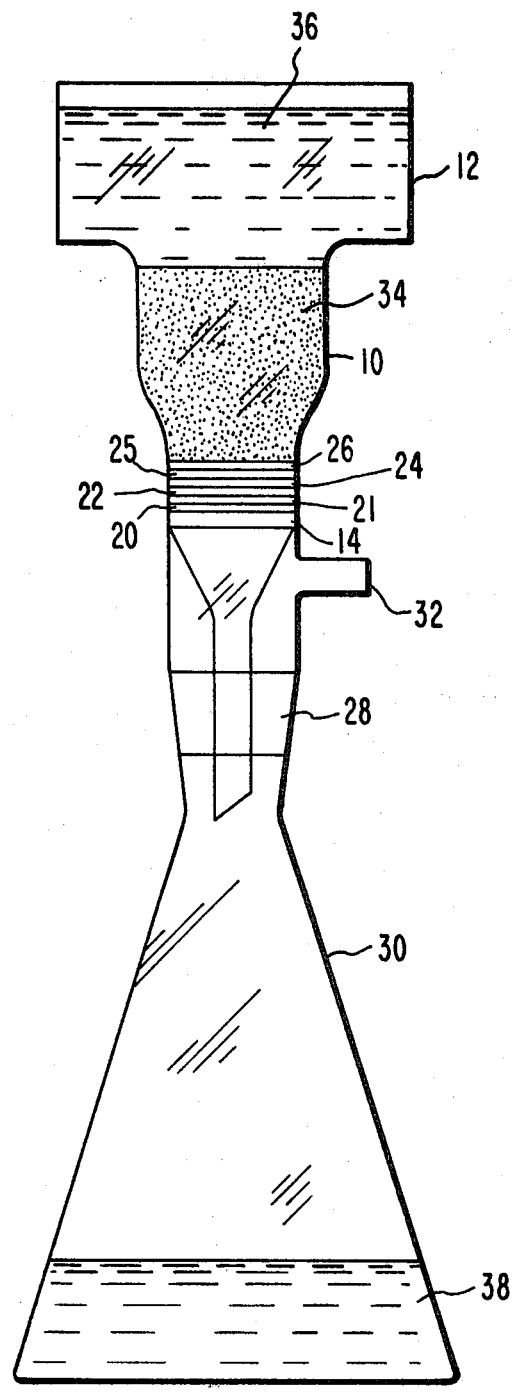

METHOD FOR REMOVING CARBON PARTICLES FROM A MOLDED ARTICLE

This invention relates to a method for separating carbon particles of submicron dimensions from a plastic matrix.

BACKGROUND OF THE INVENTION

Clemens, in U.S. Pat. Nos. 3,842,194, 3,842,217 and 3,909,517, discloses a capacitive information recording and playback system. In this system disc record replicas can be prepared having geometric variations in a spiral groove in a disc surface which represents information such as a video signal. These discs are made of plastic and coated with a thin layer of metal and a thin layer of a dielectric material. A stylus having a conductive electrode completes the capacitor and is used to reconstitute the information as an electrical signal.

Further developments in this area have produced an information disc record replica made of a conductive plastic material. Other systems based on a capacitance readout have an information track wherein geometric variations are impressed in the surface. In either the grooved or the nongrooved system the conductive disc is fabricated from a molding composition containing submicron-sized carbon particles which impart sufficient conductivity to the disc record for capacitive readout.

In order to analyze the products which result from these molding compositions it is sometimes required to remove the submicron carbon particles such as carbon black. Their small particle size, generally the particles have a diameter in the range of a few hundred angstroms, does not allow separation of the particles by ordinary means.

SUMMARY OF THE INVENTION

We have found a method for separating out carbon particles from a composition comprising a plastic and carbon particles of submicron dimensions comprising the steps of adding the composition to a solvent for the plastic which does not dissolve the carbon particles at a concentration sufficient to allow the carbon particles to separate from the plastic, and filtering the resulting mixture in a calcium carbonate column which traps essentially all of the carbon particles.

BRIEF DESCRIPTION OF THE DRAWING

The FIGURE is a schematic front view of a filtration apparatus.

DETAILED DESCRIPTION OF THE INVENTION

The carbon particles employed in a conductive plastic video disc record replica typically range in size from about 0.03 to 0.1 micrometer in diameter. The carbon particles are generally dispersed in a vinyl chloride homopolymer or copolymer matrix although other plastics may also be employed. Various additional ingredients such as resins, flow modifiers, lubricants, stabilizers, and the like may also be present in the plastic composition.

An organic solvent is employed to dissolve the plastic as well as the other components of the plastic molded article other than the carbon particles. A convenient solvent when the plastic is a vinyl choride homopolymer or copolymer is tetrahydrofuran (THF).

The amount of solvent employed is important. If the solution is too concentrated, the separation of the carbon particles from the plastic matrix may not be complete. It is believed that during the molding step the carbon particles and the plastic become intimately entwined so that sufficient solvent must be employed to dissociate the plastic from its tight bonding to the carbon particles. Too dilute a solution however will require undue expense to handle the excess solvent.

Because of the small size of the carbon particles and the use of organic solvents, the choice of filtering medium is limited. Commercially available inert filters such as those prepared of polyperfluoroethylene are generally only available down to pore sizes of 0.2 micrometer diameter. These pore sizes are too large for the carbon particles employed for preparing conductive plastic video disc record replicas.

It was found that calcium carbonate may serve as an appropriate filtering medium.

Calcium carbonate is inert to common organic solvents and is readily available at a relatively low cost.

If an organic solvent which disolves water is employed, the calcium carbonate should be anhydrous or the analysis of the filtrate may be inaccurate. Furthermore, the presence of water can interfere with the performance of the calcium carbonate as a filtering medium.

The height and the width of the calcium carbonate column as well as the amount of calcium carbonate needed may be empirically determined for each plastic composition. A higher column will require more time to filter a given mixture, but will have more theoretical plates than a wider column using the same amount of calcium carbonate. The amount of calcium carbonate employed depends on the amount of carbon particles to be removed. Generally, about 425 grams of calcium carbonate are required to remove about 0.2–0.5 gram of carbon black having an average particle size of about 0.03–0.10 micrometer in diameter.

The calcium carbonate column must be compacted before it can be an effective filtering medium. During compacting, the use of a vacuum pump at about 30 millimeters of mercury aids in the removal of large air pockets trapped in the calcium carbonate column. Air pockets provide channels for the mixture to pass through without being filtered by the calcium carbonate column.

The mixture containing the dissolved plastic and the carbon particles often contains gel particles of the plastic. These gel particles should be removed before further analysis of the plastic solution. Therefore, after the carbon particles are removed by the calcium carbonate filtering column one or more inert filters may be used to remove the gel particles. For example, an inert filter of 0.2 micron pore size may be used to remove gel particles. The resulting solution is then collected and may be analyzed by known methods of analysis such as liquid phase chromatography and spectroscopic analysis. It has been found that a vacuum pump at a pressure of about 25–30 millimeters of mercury is useful to provide a practical rate of passage of the solution through the calcium carbonate column and the one or more filters present thereafter.

Although this invention was developed for use with pressed or molded plastic articles which include carbon particles, it is to be understood that other compositions or mixtures containing carbon particles can also be separated using the present invention.

An apparatus suitable for carrying out the removal of carbon particles is shown in the FIGURE. It is a modified solvent clarification apparatus, model k-1 available from Millipore Corp., Bedford, Mass. A filter funnel 10 having a volume of 280 milliliters and a fritted glass filter 14 is employed. The filter funnel 10 is modified by adding a reservoir 12 to the top of the filter funnel 10. The reservoir 12 has a volume of about 750 milliliters. A series of filters are placed above the fritted glass filter 14. The filter which directly overlays the fritted glass filter 14 is a first filter 20 which may have a pore size of 0.45 micron. The first filter 20 is overlayed with a second filter 21 which may have a pore size of 0.2 micrometer. The second filter 21 is in turn overlayed with third filter 22 having a pore size of 0.45 micrometer. A fourth filter 24 having a pore size of 1.0 micrometer overlays the third filter 22. A fifth filter 25 having a pore size of 5.0 micrometers overlays the fourth filter 24. Finally, a sixth filter 26 which serves as a prefilter overlays the fifth filter 25.

The filter funnel 10 empties into a one liter filter flask 30. The filter funnel 30 is equipped with a joint 28 which allows separation of the filter flask from the glass filter funnel 10 to remove the filtrate solution 38. Filter flask 30 is equipped with an opening 32 which is connected to a vacuum pump, not shown. The glass filter funnel 10 is packed to form a calcium carbonate column 34 which acts to trap the carbon particles. The material to be filtered 36 is poured onto calcium carbonate column 34 and some material to be filtered 36 is stored in the reservoir 12. A vacuum pump is used to aid the passage of the material to be filtered 36 through the calcium carbonate column 34 and through the filters 20, 21, 22, 24, 25, and 26, respectively, and the fritted glass filter 14. To remove the filtrate solution 38 which collects in the filter flask 30, the vacuum source is removed, the pressure is equilibrated to atmospheric pressure, and the filter flask 30 is separated at joint 28.

The present invention may be employed with compression molded capactive, conductive plastic video disc record replicas. The disc record replica was prepared from a formulation comprising 75.0 parts of a vinyl chloride homopolymer available from B. F. Goodrich Co. as Geon 110×346 which has a weight average molecular weight of from about 70,000 to about 84,400, a number average molecular weight of 38,140 and a $T_g$ of 88° C.; 15.0 parts of Ketjenblack EC carbon black (a product of the Armak Co.) having an average particle size of 300 angstroms; 1.5 parts of dibutyltin-$\beta$-mercaptoproprionate (available as T-35 from M&T Chemical Co., Inc.); and 1.0 part of dibutyltin maleate (available as Mark 275 from Argus Chemical Co.) stabilizers; 0.5 part of a mixture of a monofatty acid ester of varying molecular weight alcohols and esters commercially available as Loxiol G-30, 0.25 part of a polyfunctional complex ester of saturated fatty acids commercially available as Loxiol G-70, both products of Henkel International GmbH; and 1.0 part of calcium stearate were employed as lubricants; 0.75 part of Acryloid K-175, a commercially available processing aid of Rohm and Haas Co; and two flow modifiers, 2.0 parts of Acryloid K-147, a solid acrylic modifier available from Rohm and Haas Co., and 3.0 parts of diundecylphthalate.

The sample to be analyzed (2 grams) was ground to a fine powder using a Wiley mill and added to 100 milliliters of spectroscopic grade THF to produce a 2% weight to volume mixture. The mixture was shaken with a mechanical shaker for 24 hours and then filtered using the apparatus described in FIG. 1.

About 425 grams of anhydrous calcium carbonate ("Baker Analyzed") was tightly packed by pressing the top of the calcium carbonate column 34 while opening 32 was connected to a vacuum pump drawing at a pressure 30 millimeters of Hg. A series of Teflon filters 20, 21, 22, 24, 25, and 26 (available from the Millipore Co.) were then used between the fritted glass filter and the calcium carbonate column 34.

The THF mixture was then carefully poured into the center of the top of the calcium carbonate column 34. The filtrate which was collected was free of carbon black.

In addition to carbon black, calcium stearate and T-35 were insoluble in THF and were also trapped by the calcium carbonate column.

A dry-blend of the ingredients rather than a video disc record replica to prepare itself was separated using a 2 gram sample in a 2% weight to volume THF mixture.

CONTROL

In the absence of the calcium carbonate column 38, the separation of the carbon particles from the plastic matrix of the video disc record replica previously discussed was not successful. The filters 20, 21, 22, 24, 25 and 26 could not prevent carbon particles from passing through and being present in the filtrate 38 collected in the filter flask 30.

We claim:

1. A method for separating out carbon particles from a composition comprising a plastic consisting of a homopolymer or copolymer of vinylchloride and carbon particles of submicron dimensions comprising the steps of:
    adding the composition to an organic solvent which dissolves the plastic and does not dissolve the carbon particles, wherein the concentration of the resulting plastic solution is sufficiently dilute to allow the carbon particles to be free from the plastic, and
    filtering the resulting mixture in a column of calcium carbonate which traps essentially all of the carbon particles and allows the plastic solution to pass through.

2. A method in accordance with claim 1 wherein the calcium carbonate is anhydrous.

3. A method in accordance with claim 1 wherein the carbon black has an average particle size of about 300 angstroms in diameter.

* * * * *

UNITED STATES PATENT AND TRADEMARK OFFICE
CERTIFICATE OF CORRECTION

PATENT NO. : 4,369,307

DATED : January 18, 1983

INVENTOR(S) : Nitin Vithalbhai Desai and Robert Francis Poll

It is certified that error appears in the above-identified patent and that said Letters Patent is hereby corrected as shown below:

IN THE HEADING UNDER INVENTORS:

Inventors should be --Nitin V. Desai, Hightstown; Robert F. Poll, Somerset; and Bernard L. Goydish, Somerville, all of N.J.--

Signed and Sealed this

First Day of May 1984

[SEAL]

*Attest:*

*Attesting Officer*

GERALD J. MOSSINGHOFF

*Commissioner of Patents and Trademarks*